United States Patent
Rogers et al.

(10) Patent No.: US 6,869,455 B2
(45) Date of Patent: Mar. 22, 2005

(54) CARBON FOAM ABRASIVES

(75) Inventors: Darren Kenneth Rogers, Wheeling, WV (US); Janusz Wladyslaw Plucinski, Glen Dale, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 10/068,074

(22) Filed: Feb. 5, 2002

(65) Prior Publication Data

US 2003/0101657 A1 Jun. 5, 2003

Related U.S. Application Data

(63) Continuation-in-part of application No. 09/902,828, filed on Jul. 10, 2001, which is a continuation-in-part of application No. 09/976,425, filed on Oct. 12, 2001.

(51) Int. Cl.⁷ ................................................. C10C 5/00
(52) U.S. Cl. ............................ 44/620; 156/78; 423/76; 423/448; 423/460; 428/408; 428/489
(58) Field of Search ........................ 44/620, 607, 638; 156/178; 423/76, 448; 428/408, 489; 201/21, 35

(56) References Cited

U.S. PATENT DOCUMENTS 3,309,437 A * 3/1967 Harnett ....................... 264/49

FOREIGN PATENT DOCUMENTS

GB        1489690        * 5/1976

OTHER PUBLICATIONS

Kirk–Othmer, Encycclopedia of Chemical Technology, 4th Edition, vol. 6, John Wiley & Sons, Inc. NY., application of Coal Petrology & Petrography, pp. 429–434 and 454–455, 1993.*

SU 973, 509 A English Abstract, (BELOI), Nov. 1982.*

SU 536,148 A, English Abstract, (DEMII). Jan. 1977.*

JP 53–094,313 A, English Abstract, (IBIG), Aug. 1978. ☐☐☐☐CN 1290755A, Englsih Abstract, (YELLI), Apr. 2001.*

* cited by examiner

Primary Examiner—Margaret B. Medley
(74) Attorney, Agent, or Firm—McGuireWoods LLP

(57) ABSTRACT

The incorporation or blending of from about 1 to about 10% by volume of a "carbide precursor" powder, preferably on the order of <100 microns in size, with a coal particulate starting material and the subsequent production of carbon foam in accordance with the method described herein, results in a carbon foam that exhibits significantly enhanced abrasive characteristics typical of those required in the polishing of, for example glass, in the manufacture of cathode ray tubes.

26 Claims, 4 Drawing Sheets

CARBON FOAM ABRASIVES

This application is a continuation-in-part of U.S. Ser. No. 09/902,828, filed on Jul. 10, 2001, and which is a CIP of U.S. patent application Ser. No. 09/976,425 filed Oct. 12, 2001 entitled "Carbon Foam Abrasives" and copending herewith.

The U.S. Government has a paid-up license in this invention and the right in limited circumstances to require the patent owner to license other on reasonable terms as provided for by the terms of contract no. N00014-00-C-0062 awarded by Office of Naval Research.

FIELD OF THE INVENTION

The present invention relates to carbon foam materials and more particularly to coal-based carbon foams that include reaction bonded abrasive materials.

BACKGROUND OF THE INVENTION

There exists a continuing need for improved and enhanced abrasive materials that exhibit high strength and excellent abrasion properties for application in such areas as the polishing of glass for use in cathode ray tubes and the like.

U.S. patent application Ser. No. 09/453,729 filed Dec. 2, 1999 and entitled, "Coal-Based Carbon Foams describes a family of high strength, carbon foams having a density of preferably between about 0.1 g/cm$^3$ and about 0.8 g/cm$^3$ produced by the controlled heating of coal particulate preferably under a non-oxidizing atmosphere. The coal-based carbon foams produced in accordance with the method described in this application can be carbonized and graphitized to yield very strong carbon foams that are extremely resistant to oxidation and ablation.

The graphitized carbon foams described in this application, exhibit compressive strengths up to about 6000 psi and untreated demonstrate abrasive properties significantly better than those of the untreated coal-based carbon foams.

OBJECT OF THE INVENTION

It is an object of the present invention to improve the abrasive properties of the carbon foam materials of the aforementioned U.S. patent application Ser. No. 09/453,729 without adversely affecting any of their other properties, particularly their strengths.

SUMMARY OF THE INVENTION

It has now been discovered that the incorporation of from about 1 to about 10 volume percent of a carbide precursor such as titanium, silicon, tungsten etc. in a finely powdered form into the initial coal powder starting material described in aforementioned U.S. patent application Ser. No. 09/453, 729 results in the formation of the carbides of these materials upon foaming, carbonization and graphitization. Such carbides are of course well known abrasives and their incorporation into the already high strength, oxidation resistant and inherently ablation resistant carbon foams previously described results in significantly improved abrasive materials.

DETAILED DESCRIPTION

U.S. patent application Ser. No. 09/453,729 filed Dec. 2, 1999 and entitled, "Coal-Based Carbon Foams", which is incorporated herein by reference in its entirety, describes a family of high strength, carbon foams having a density of preferably between about 0.1 g/cm$^3$ and about 0.8 g/cm$^3$ produced by the controlled heating of coal particulate preferably under a non-oxidizing atmosphere. The coal-based carbon foams produced in accordance with the method described in this application are carbonized and graphitized to yield very strong carbon foams that are extremely resistant to oxidation and ablation in their own right, but even more so when produced in accordance with the method described herein.

The process described in this prior application comprises: 1) heating a coal particulate of preferably small i.e., less than about ¼ inch particle size in a "mold" and under a non-oxidizing atmosphere at a heat up rate of from about 1 to about 20° C. per minute to a temperature of between about 300 and about 700° C.; 2) soaking at a temperature of between about 300 and 700° C. for from about 10 minutes up to about 12 hours to form a green foam; and 3) controllably cooling the green foam to a temperature below about 100° C. According to the method described in the aforementioned application, the green foam is subsequently preferably carbonized by the application of known techniques, for example, soaking at a temperature of between about 800° C. and about 1200° C. for a period of from about 1 to about 3 hours. Although this is the preferred temperature range for carbonization, carbonization can actually occur at temperatures between about 600° C. and 1600° C. Graphitization, commonly involves heating the green foam either before or after carbonization at a heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

Figure 1:
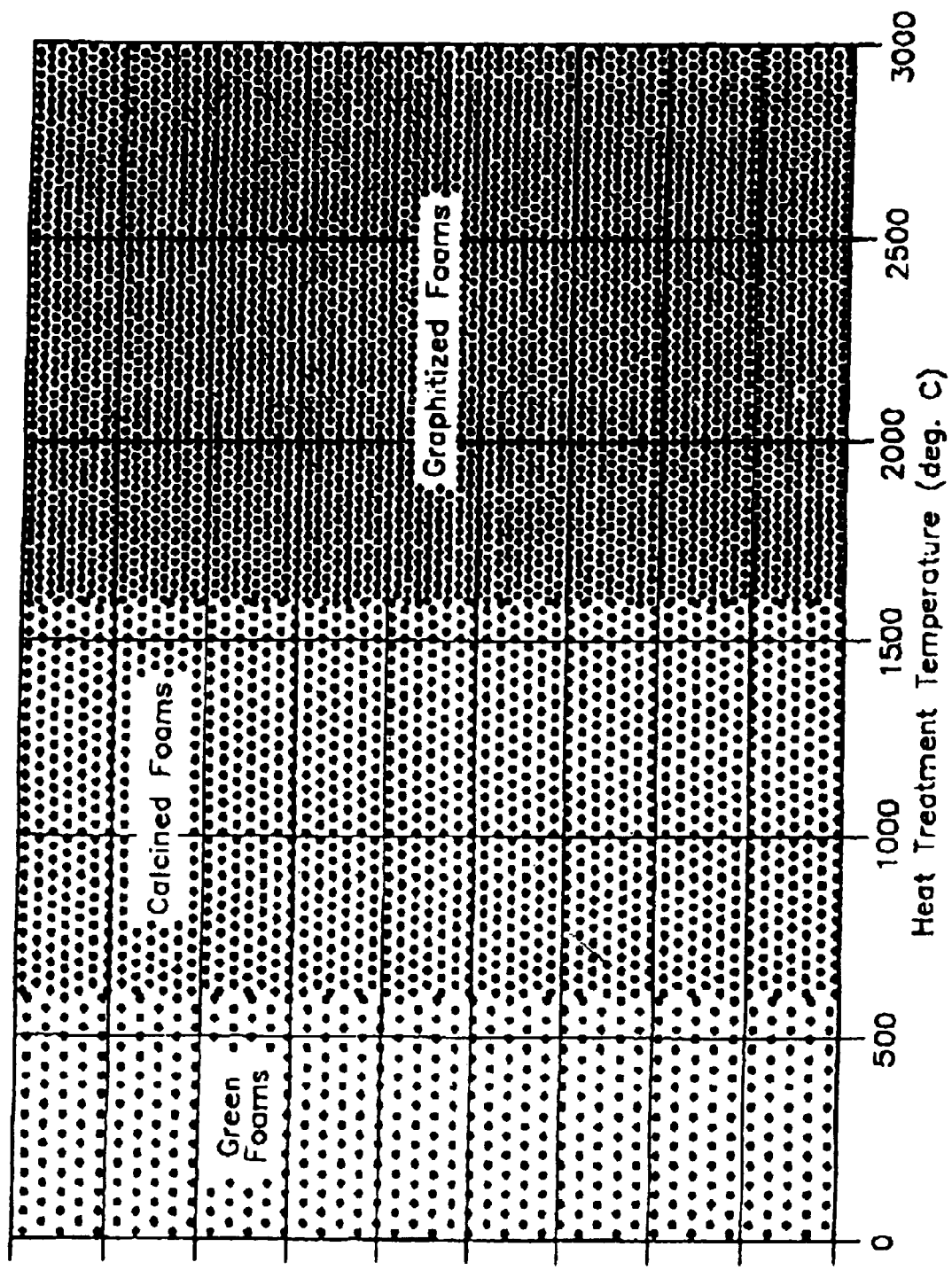
FIG. 1 is a graph showing the heat treatment temperatures for the various phases of the production process used in the fabrication of the abrasive carbon foam of the present invention.

The temperature ranges for the various thermal treatments of the materials described in the aforementioned patent application and in this application are shown graphically in FIG. 1. The foams thus produced exhibit a significant resistance to oxidation and ablation and can serve as abrasives in their own right.

It has now been discovered that the incorporation or blending of from about 1 to about 10% by volume of a "carbide precursor" powder, preferably on the order of <100 microns in size, with the coal particulate starting material and the subsequent production of carbon foam in accordance with the method described herein, results in a carbon foam that exhibits significantly enhanced abrasive characteristics typical of those required in the polishing of, for example glass, in the manufacture of cathode ray tubes.

"Carbide precursors" of the type useful in accordance with the present invention include but are not limited to such materials as silicon that forms silicon carbide, tungsten that forms tungsten carbide and titanium that forms titanium carbide during calcination and graphitization as described herein. However, any material capable of reacting with carbon during the calcination and graphitization operations as described herein to form an abrasive carbide that is "reaction bonded" to the carbon foam skeleton are suitable candidates for application in the abrasive carbon foams described herein. "Reaction bonded" carbides comprise those carbides that are reactively bonded to the foam structure or skeleton during the foam, calcination and graphitization processes, as opposed to similar carbide materials that might simply be added as a blend with the starting material coal and remain in their unreacted state as "free" carbides (i.e. unbonded) in the final carbon foam product.

The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh and exhibit "free swell indices" between about 3.75 and about 4.5.

It is critical to the successful practice of the present invention that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products in the form of the lowest calcined foam densities and the highest calcined foam specific strengths (compressive strength/density). Such bituminous coals that also possess the foregoing set of properties, high volatile content (35% to 45% by weight), large plastic range (at least about 50° C.), etc. and are thus characterized as high volatile bituminous coals, form the preferred starting materials of the process of the present invention. Coals having free swell indices below the specified preferred ranges may not agglomerate properly leaving a powder mass or sinter, but not swell or foam, while coals exhibiting free swell indices above these preferred ranges may heave upon foaming and collapsed upon themselves leaving a dense compact.

Additionally, according to further highly preferred embodiments of the present invention the coal starting materials of the present invention possess all or at least some of the following characteristics: 1) a volatile matter content (dry, ash-free basis) of between about 35 and about 35% as defined by ASTM D3175, "Test Method for Volatile Matter in the Analysis of Coal and Coke"; 2) a fixed carbon (dry basis) between about 50 and about 60% as defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinit, fusinite, and mineral matter as determined by ASTM D2798; and 9) no significant oxidation of the coal (0.0 vol % moderate or severe oxidation) as determined by ASTM D 2798 and non-maceral analysis.

The low softening point (380–400° C.) is important so that the material softens and is plastic before volatalization and coking occur. The large plastic working range or "plastic range" is important in that it allows the coal to flow plastically while losing mass due to volatalization and coking. Vitrinite reflectance, fixed carbon content and volatile matter content are important in classifying these coal starting materials as "high-volatile" bituminous coals that provide optimum results in the process of the present invention and thus, carbon foam materials that exhibit an optimum combination of properties when prepared in accordance with the process described and claimed herein. The presence of oxidation tends to hinder fluidity and consequently, foam formation.

Thus according to various preferred embodiments of the present invention, a coal particulate starting material characterized as a high-volatile bituminous coal containing from about 35% to about 45% by weight (dry, ash-free basis) volatile matter, as defined by ASTM D3175, is a basic requirement for obtaining optimum results in the form of optimum carbon foaming in accordance with the process of the present invention. The various parameters derived from the Gieseler plasticity evaluations form the second highly important set of characteristics of the starting material coal if optimum results are to be obtained. Thus, a softening point in the range of from about 380° C. and about 400° C., a plastic range of at least about 50° C. and preferably between about 75 and 100° C., and a maximum fluidity of at least several hundred and preferably greater than 2000 ddpm (dial divisions per minute) are highly important to the successful optimized practice of the present invention. Accordingly, in order to obtain the carbon foams exhibiting the superior properties described herein, it is important that the coal starting material be a high volatile bituminous coal having a softening point as just described and a plastic range on the order of above about 50° C. all with the indicated Gieseler fluidity values described. Exhibition of Arnu dilatation values greater than about 20% and preferably above about 100% when combined with the foregoing characteristics provide indications of a highly preferred high volatile bituminous coal starting material.

The carbon foam abrasives described herein are semi-crystalline or more accurately turbostratically-ordered and largely isotropic i.e., demonstrating physical properties that are approximately equal in all directions. The abrasive carbon foams of the present invention typically exhibit pore sizes on the order of less than 300$\mu$, although pore sizes of up to 500$\mu$ are possible within the operating parameters of the process described. The thermal conductivities of the cellular coal-based products are generally less than about 1.0 W/m/°K. Typically, the abrasive carbon foams of the present invention demonstrate compressive strengths on the order of from about 2000 to about 6000 psi at densities of from about 0.3 to about 0.5 g/cm$^3$ and between about 2200 and about 300 psi at densities between about 0.3 g/cm$^3$ and about 0.4 g/cm$^3$.

The method of producing the abrasive carbon foams of the present invention comprises initially: 1) heating a coal particulate of preferably small, i.e. less than about ¼ inch particle size, blended with from about 1 to about 10 volume percent of a "carbide precursor" powder in a "mold" and under an inert or non-oxidizing atmosphere at a heat up rate of from about 1 to about 20° C. per minute to a temperature of between about 300 and about 600° C.; 2) soaking at a temperature of between about 300 and 600° C. for from about 10 minutes up to about 12 hours to form a "green foam"; 3) controllably cooling the "green foam" to a temperature below about 100° C.; carbonizing the green foam in an inert or non-oxidizing atmosphere to produce a carbonized foam; and graphitizing. The inert or non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

Blending of the coal particulate and the "carbide precursor" can be carried out in any of a number of conventional fashions. For example, dry blending of the coal particulate and the "carbide precursor" in a ball mill works entirely satisfactorily. Other blending methods include, wet or solvent jar milling and multiple cycle co-pulverization using a Holmes disc pulverizer or the like. So long as a satisfactorily uniform and intimate mixture of the components is obtained, the particular method of blending is not of critical importance.

It is generally not desirable that the reaction chamber be vented or leak during this heating and soaking operation. The pressure of the chamber and the increasing volatile content therein tends to retard further volatilization while the cellular product sinters at the indicated elevated temperatures. If the furnace chamber is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define any mechanism for providing controlled dimensional forming of the expanding coal or carbon or containing the foaming operation. Thus, any chamber into which the coal particulate and carbide precursor blend is deposited prior to or during heating and which, upon the foam precursor attaining the appropriate expansion temperature, contains the expanding carbon to some predetermined configuration such as: a flat sheet; a curved sheet; a shaped object; a building block; a rod; tube or any other desired solid shape can be considered a "mold" for purposes of the instant invention. The term "mold" as used herein, is also meant to include any container, even an open topped container that "contains" the expanding mixture so long as such a device is contained in a pressurizable vessel that will permit controlled foaming as described herein. Clearly, a container that results in the production of some particular near net or net shape is particularly preferred.

As will be apparent to the skilled artisan familiar with pressurized gas release reactions, as the pressure in the reaction vessel, in this case the mold increases, from 0 psi to 500 psi, as imposed by the inert or non-oxidizing gas, the reaction time will increase and the density of the produced porous coal will increase as the size of the "bubbles" or pores produced in the expanded carbon decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc.

Cooling of the "green foam" after soaking is not particularly critical except as it may result in cracking of thereof as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the carbon material as just described, the "green foam" is an open celled material. Several techniques have been developed for "sealing" the surface of the open celled structure to improve its adhesive capabilities for further fabrication and assembly of a number of parts. For example, a layer of a commercially available graphitic adhesive (for example an epoxy-graphite adhesive) can be coated onto the surface and cured at elevated temperature or allowed to cure at room temperature to provide an adherent skin. Alternatively, the expansion operation can be modified by cooling the "green foam" rapidly, e.g., at a rate of 10° C./min or faster after expansion. It has been discovered that this process modification results in the formation of a more dense skin on the "green foam" which presents a closed pore surface to the outside of thereof. At these cooling rates, care must be exercised to avoid cracking.

After expanding, the "green foam" is readily machineable, sawable and otherwise readily fabricated using conventional fabrication techniques.

A variety of additives and structural reinforcers may be added to the carbon materials of the present invention either before or after expansion to enhance specific mechanical properties such as fracture strain, fracture toughness and impact resistance. For example, particles, whiskers, fibers, plates, etc. of appropriate carbonaceous or ceramic composition can be incorporated into the abrasive foam to enhance its mechanical properties.

The abrasive carbon foams of the present invention can additionally be impregnated with; for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape or final products of specific dimensions and is readily determinable through trial and error with the particular carbon starting material being used. The shrinkage may be further minimized by the addition of some inert solid material such as coke particles, ceramic particles, ground waste from the coal expansion process etc. as is common practice in ceramic fabrication.

According to the method of the present invention, subsequent to the production of the "green foam" as just described, the "green foam" is subjected to carbonization and graphitization within the controlled conditions described below to obtain the abrasive foam of the present invention.

Carbonization, sometimes referred to as calcining, is conventionally performed by heating the green foam under an appropriate inert gas at a heat-up rate of less than about 5° C. per minute to a temperature of between about 600° C. and about 1600° C. and preferably between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the green foam such as sulfur, oxygen, hydrogen, etc.

Graphitization, commonly involves heating the carbon foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres. According to a preferred embodiment of the process described herein, the abrasive foams of the present invention are produced by sequentially carbonizing and then graphitizing the green foam as described above.

As will be apparent to the skilled artisan, graphitization according to the method described herein inherently results in carbonization in the course of the graphitization process. Thus, although carbonization is recited and may indeed be performed as a descrete operation, it is in fact a portion of the graphitization procedure being achieved as the "green foam" passes through the carbonization thermal regimen on its way toward graphitization at a higher temperature.

Typically, the abrasive carbon foams described herein exhibit the following additional properties at a density of between about 0.3 g/cm$^3$ and about 0.4 g/cm$^3$: tensile strength, 300–1000 psi; shear strength 300 psi; and impact resistance 0.3–0.4 ft-lbs/in$^2$.

The following examples will serve to better illustrate the successsful practice of the invention.

EXAMPLE

Three samples of high volatile bituminous Upper Elkhorn (Pike County, Ky.) coal containing about 30% by weight of volatile matter were doped with 3% by volume of tungsten, titanium and silicon respectively, are foamed at a temperature between about 450 and 500° C. under an inert atmosphere of helium as 500 psi using a 2° C. per minute heat up rate and a 2 hour residence at temperature to form the green foam. The green foam was then carbonized in an electric resistance furnace at a temperature of 1050° C. using a 0.5° C. heat up rate and a residence time of two hours. The carbonized abrasive foam was then graphitized at a temperature of 2200° C. using the procedures described above.

Figure 2:
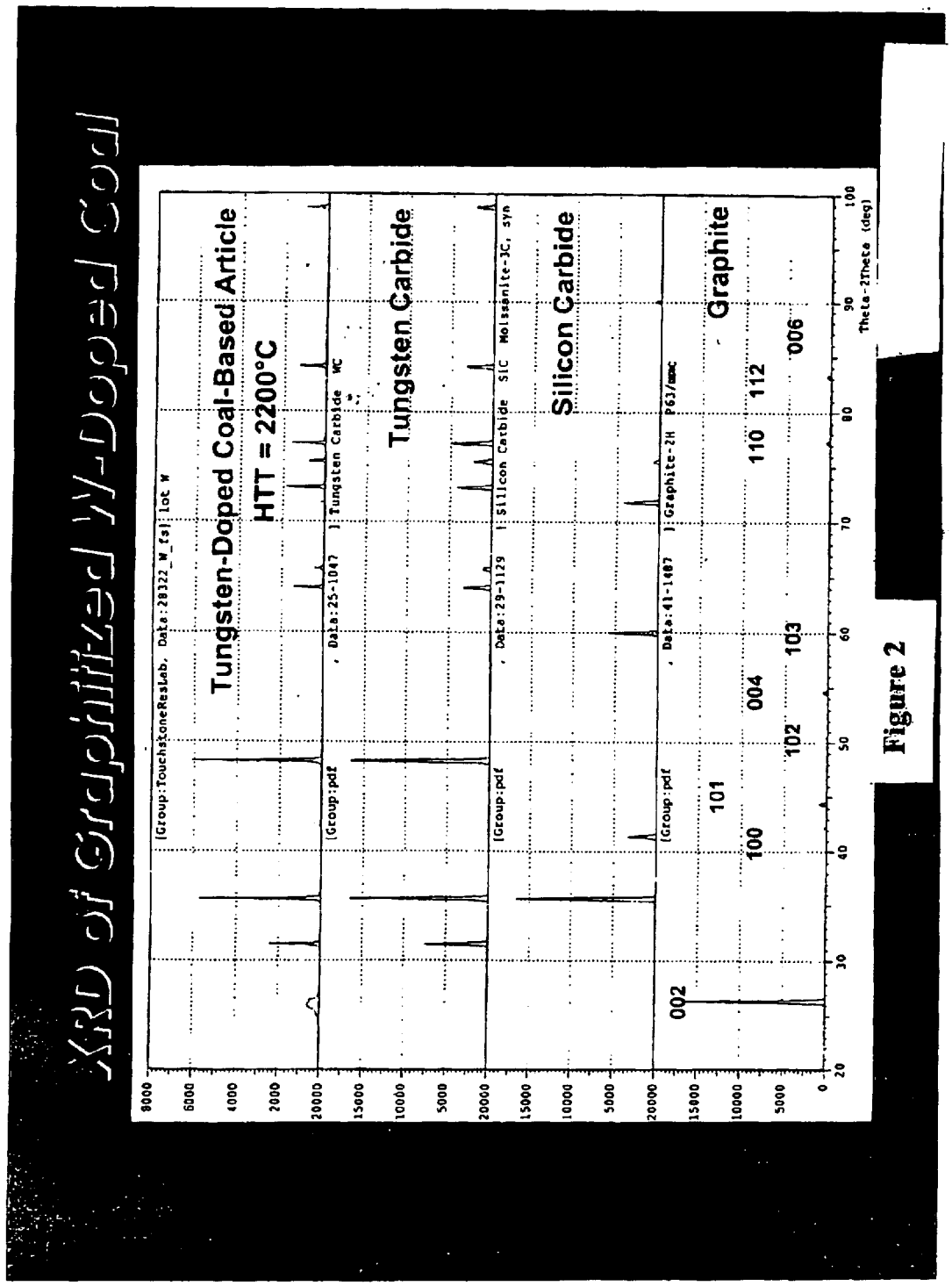
FIGS. 2–4 show comparative X-ray diffraction patterns for a variety of carbide precursor doped abrasive carbon foams in accordance with the present invention.
Figure 3:
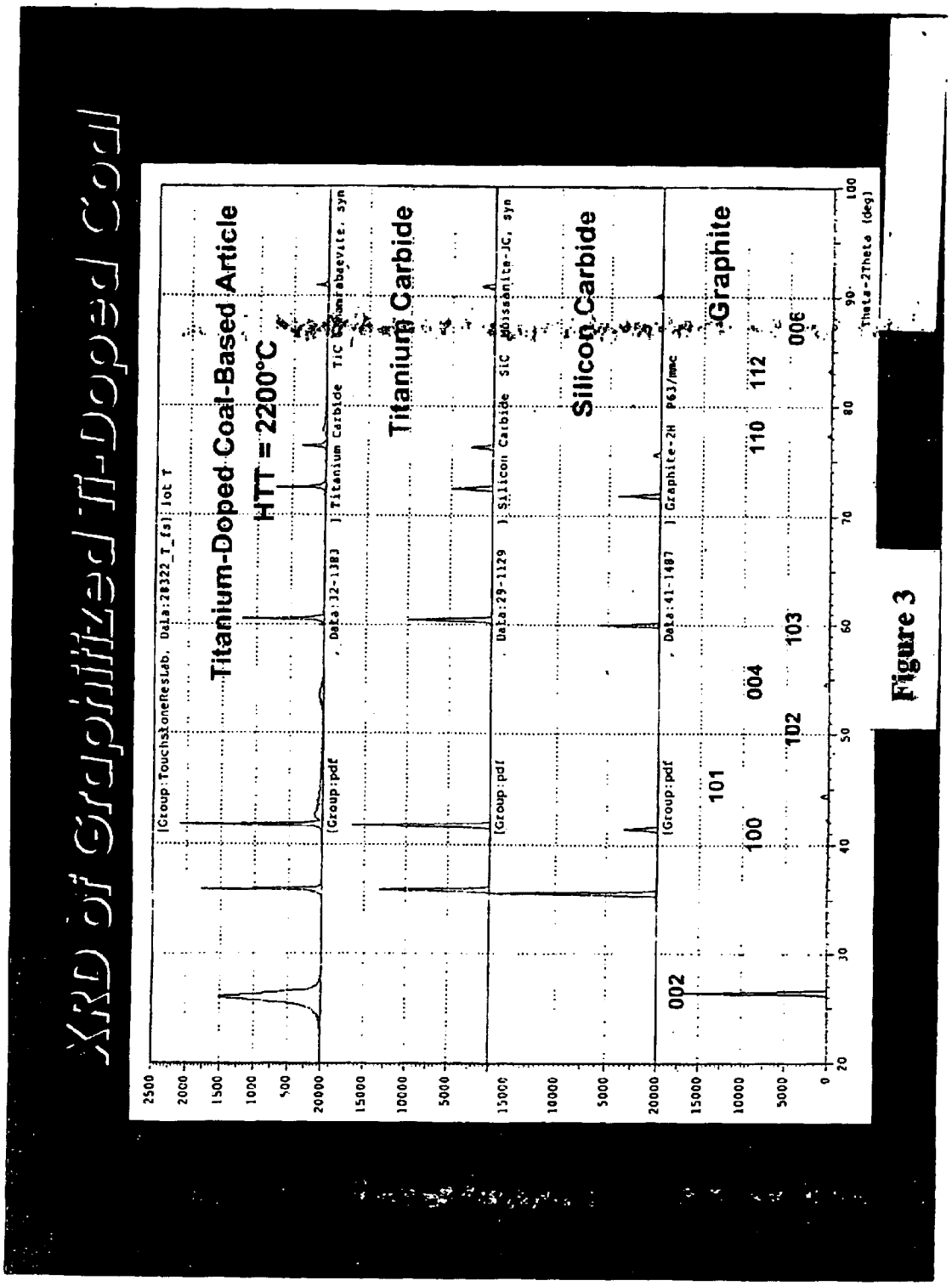
Figure 4:
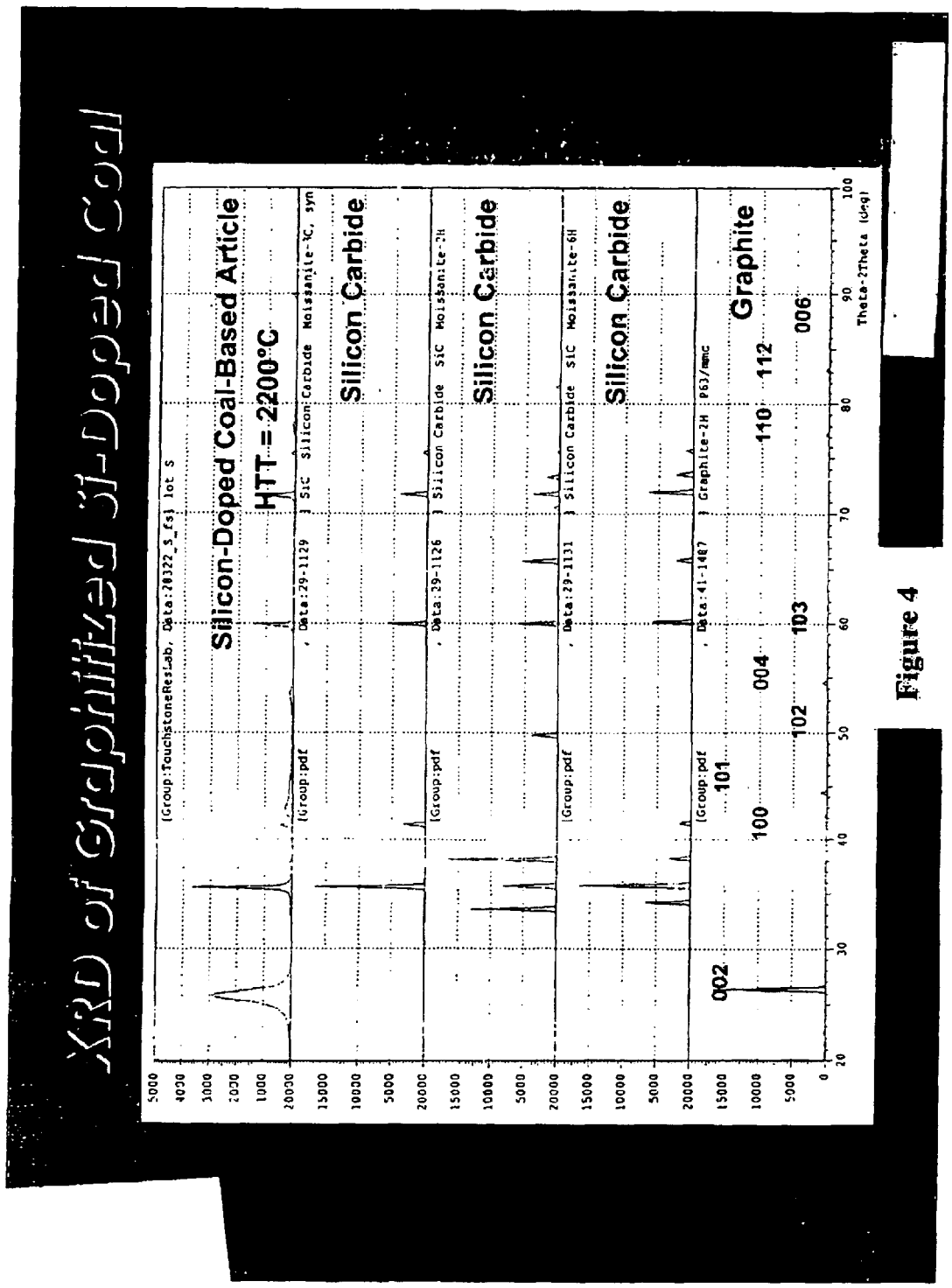

As shown in FIGS. 2–4, X-ray diffraction analysis of each of the samples showed the presence of the anticipated metallic carbide when compared to X-ray diffraction patterns of the undoped graphite matrix, the pure metallic carbide and silicon carbide as a control in two of the cases. It is thus apparent that doping by blending of the carbide precursor powder as described herein produced a graphitized carbon foam matrix that incorporated the expected metallic carbide.

Evaluations of these materials showed that their abrasive properties are significantly better than those of the undoped graphitized carbon foam.

As the invention has been described, it will be apparent to those skilled in the art that the same may be varied in many ways without departing from the spirit and scope of the invention. Any and all such modifications are intended to be included within the scope of the appended claims.

What is claimed is:

1. A method of forming an abrasive carbon foam, comprising:

comminuting coal to form a particulate coal;

blending said particulate coal with from about 1 to about 10% by volume of a carbide precursor to form a reactive blend, wherein the carbide precursor is selected from the group consisting of tungsten, silicon and titanium;

heating said reactive blend in a mold under a non-oxidizing atmosphere to a first temperature ranging from about 300° C. to about 600° C., wherein the first heating step includes controlling the pressure ranging from about 50 psi to about 500 psi and soaking at this temperature for a period ranging from about 10 minutes to about 12 hours to form a green foam blend;

carbonizing said green foam blend to form a carbonized foam by heating to a second temperature ranging from about 600° C. to about 1600° C. in an inert atmosphere and holding at said second temperature for a period ranging from about 1 to about 3 hours to form a carbonized foam; and graphitizing said carbonized foam by heating said carbonized foam to a third temperature ranging from about 1700° C. to about 3000° C. in an inert atmosphere and holding at said third temperature for a period of greater than about one hour to form said abrasive carbon foam.

2. The method of forming an abrasive carbon foam of claim 1, wherein said coal particulate is a high volatile bituminous coal containing a volatile matter ranging from about 35% to about 45% by weight.

3. The method of forming an abrasive carbon foam of claim 2, wherein said high volatile bituminous coal exhibits an expansion of at least about 20% as determined by Arnu dilatation.

4. The method of forming an abrasive carbon foam of claim 3, wherein said high volatile bituminous coal exhibits an expansion of at least about 100% as determined by Arnu dilatation.

5. The method of forming an abrasive carbon foam of claim 2, wherein said high volatile bituminous coal comprises:

from about 50 to about 60% by weight of fixed carbon; and less than about 30% by weight inert maceral material;

wherein the high volatile bituminous coal exhibits a vitrinite reflectance in the range from about 0.80 to about 0.95 as determined by ASTM D2798.

6. An abrasive carbon foam, comprising:

a semi-crystalline porous coal-based structure having a density ranging from about 0.2 to about 0.5 g/cm$^3$, wherein the density is varied by an introduction of an inert non-oxidizing gas into a reaction vessel; and wherein the semi-crystalline porous coal-based structure includes a metallic carbide for improving abrasive character of the abrasive carbon foam wherein the carbide precursor is elected from the group consisting of tungsten, silicon and titanium.

7. The abrasive carbon foam of claim 6, wherein the abrasive carbon foam has a density ranging from about 0.3 to about 0.4 g/cm$^3$.

8. A method for producing an abrasive carbon foams, comprising:

comminuting coal to form a particulate coal;

blending said particulate coal with from about 1 to about 10% by volume of a carbide precursor to form a reactive blend for improving abrasive properties of the abrasive carbon foam wherein the carbide precursor is selected from the group consisting of tungsten, silicon and titanium; and heating said reactive blend in a mold under a non-oxidizing atmosphere to a first temperature ranging from about 300° C. to about 600° C., wherein the pressure is controlled to a range from about 50 psi to about 500 psi; and soaking at this temperature for a period ranging from about 10 minutes to about 12 hours to form an abrasive carbon foam.

9. The method for producing an abrasive carbon foam of claim 8, further comprising:

carbonizing said abrasive carbon foam by heating to a second temperature ranging from about 600° C. to about 1600° C. in an inert atmosphere and holding at said second temperature for a period ranging from about 1 to about 3 hours; and graphitizing said carbonized foam by heating said abrasive carbon foam to a third temperature ranging from about 1700° C. to about 3000° C. in an inert atmosphere and holding at said third temperature for a period of less than about one hour to form;

wherein said carbide precursor comprises a member selected from the group consisting of materials capable of reacting with carbon to form carbides under carbon calcining and graphitizing conditions.

10. The method of forming an abrasive carbon foam of claim 8, wherein the abrasive carbon foam has a density ranging from about 0.2 g/cm$^3$ to about 0.5 g/cm$^3$.

11. The method for producing an abrasive carbon foam of claim 9, wherein said carbide precursor is a powder having particle sizes below about 100 microns.

12. The method for producing an abrasive carbon foam of claim 8, wherein said particulate coal exhibits a free swell index ranging from about 3.5 to about 5.0.

13. The method of forming an abrasive carbon foam of claim 8, wherein the abrasive carbon foam has a density ranging from about 0.3 g/cm$^3$ to about 0.4 g/cm$^3$.

14. The method of forming an abrasive carbon foam of claim 1, wherein said particulate coal exhibits a free swell index ranging from about 3.5 to about 5.0.

15. The method of forming an abrasive carbon foam of claim 1, wherein said carbide precursor comprises a member selected from the group consisting of materials capable of reacting with carbon to form carbides under carbon calcining and graphitizing conditions.

16. The method of forming an abrasive carbon foam of claim 13, wherein said particulate coal exhibits a free swell index ranging from about 3.75 to about 4.5.

17. The method of forming an abrasive carbon foam of claim 1, wherein said carbide precursor is powder having particle sizes below about 100 microns.

18. The method of forming an abrasive carbon foam of claim 1, wherein the abrasive carbon foam has a semi-crystalline, largely isotropic, porous coal-based structure having a density ranging from about 0.2 to about 0.5 g/cm$^3$.

19. The method of forming an abrasive carbon foam of claim 18, wherein the density ranges from about 0.3 to about 0.4 g/cm$^3$.

20. The abrasive carbon foam of claim 6, wherein the abrasive carbon foam has pore sizes of below about 300 μm.

21. The method of forming an abrasive carbon foam of claim 2, wherein said high volatile bituminous coal has a Gieseler initial softening temperature above about 380° C.

22. The method of forming an abrasive carbon foam of claim 21, wherein said high volatile bituminous coal has a Gieseler initial softening temperature ranging from about 380° C. to about 400° C.

23. The method of forming abrasive carbon foam of claim 2, wherein said high volatile bituminous coal has a plastic range of at least about 50° C.

24. The method of forming an abrasive carbon foam of claim 2, wherein said high volatile bituminous coal has a plastic range ranging from about 75° C. to about 100° C.

25. The method of forming an abrasive carbon foam of claim 2, wherein said high volatile bituminous coal has a maximum fluidity of at least several hundred ddpm as determined by ASTM D2639.

26. The method of forming an abrasive carbon foam of claim 25, wherein said high volatile bituminous coal has a maximum fluidity of more than 2000 ddpm as determined by ASTM D2639.

* * * * *